J. D. SULLIVAN.
LAWN SPRINKLER.
APPLICATION FILED AUG. 17, 1921.
1,401,009.
Patented Dec. 20, 1921.
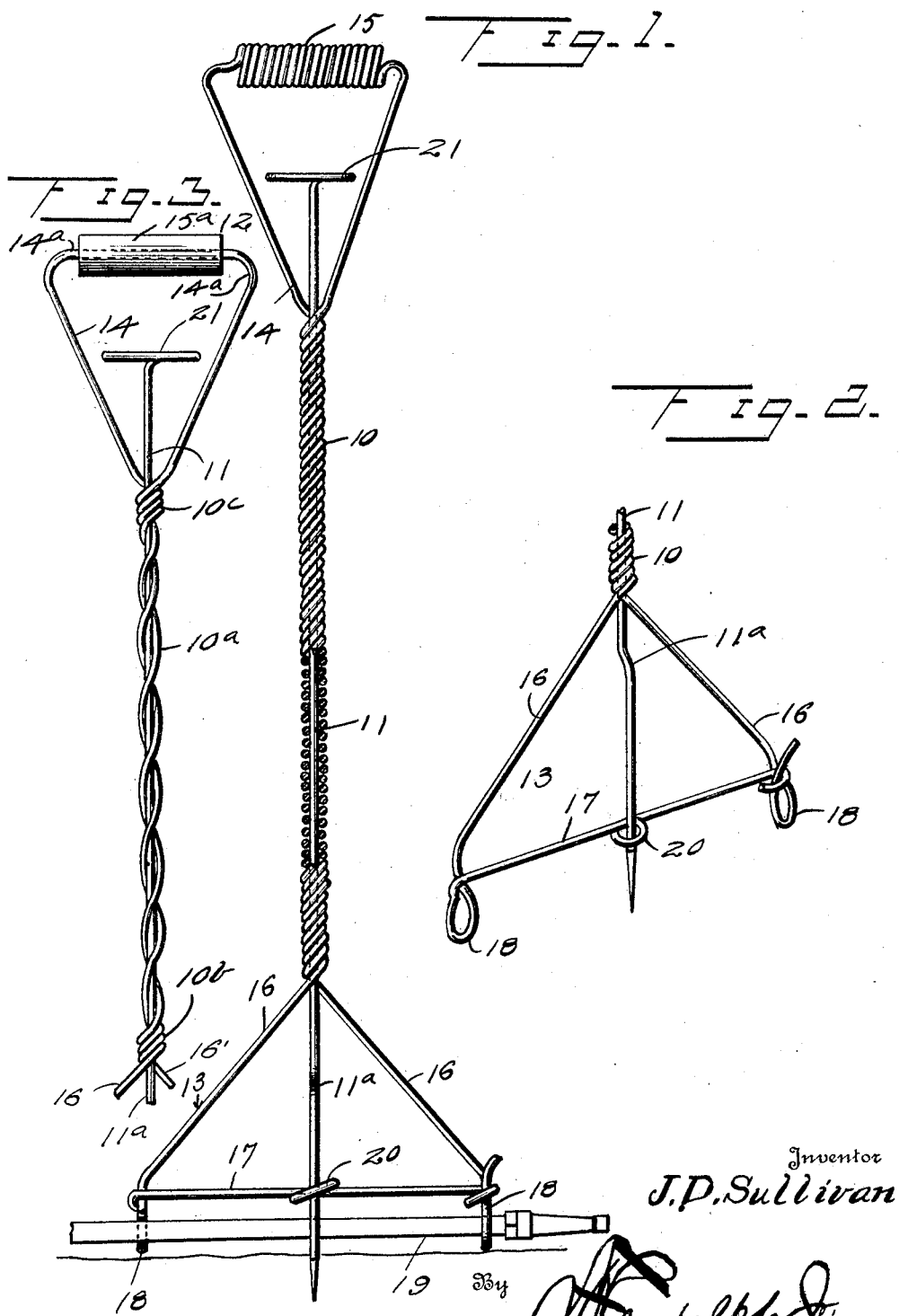
Inventor
J. P. Sullivan
By
Attorney

UNITED STATES PATENT OFFICE.

JOHN D. SULLIVAN, OF SALT LAKE CITY, UTAH.

LAWN-SPRINKLER.

1,401,009.     Specification of Letters Patent.     Patented Dec. 20, 1921.

Application filed August 17, 1921. Serial No. 492,979.

*To all whom it may concern:*

Be it known that I, JOHN D. SULLIVAN, a citizen of the United States, residing at Salt Lake City, in the county of Salt Lake and State of Utah, have invented certain new and useful Improvements in Lawn-Sprinklers; and I do hereby declare the following to be a full, clear, and exact description of the invention, such as will enable others skilled in the art to which it appertains to make and use the same.

The object of the invention is to provide a simple and efficient means whereby a hose of the kind used in lawn sprinkling operations may readily be carried from place to place and positioned and secured to direct the stream of water as may be desired with reference to the different portions of the lawn or shrubbery without necessitating the handling thereof directly by the operator and therefore without exposing the operator to the drippings from the nozzle and the back spray due to counter gusts of wind and the like; and with this object in view the invention consists in a device of which a preferred embodiment is shown in the drawing, wherein:

Figure 1 is a side elevation partly in section illustrating the device with a hose nozzle attached thereto.

Fig. 2 is a detail view of the foot portion of the device.

Fig. 3 is a fragmentary view, illustrating a modified form of my invention.

The apparatus consists essentially of a coiled wire shank 10 of tubular form constituting a guide for a stem 11 and provided at its upper end with a handle 12 and at its lower end with a foot 13, the strands of wire constituting a coil 10 being divergently disposed at their upper ends to form the Y 14 and the extremities of the arms of the Y being connected by a coil 15 forming a grip. Correspondingly the extremities of the strands forming the coils 10 are separated and divergently disposed at their lower ends to provide the arms 16 connected by a transverse rod 17 with depending loops or eyes 18 at the angles to form seats for the reception of the hose 19. Said transverse bar 17 is also provided at its center with a lateral loop forming a guide eye 20 through which extends the lower end of the stem 11, preferably offset at 11ª to pass through said eye and the lower extremity of the stem being reduced or sharpened to facilitate engagement with the ground for anchoring the device and hence the hose engaged therewith in the desired position, the stem 11 being slidable through the guide formed by the bore of the coiled stem and the eye 20 and being provided at its upper end in the space bounded by the handle 12 with a cross head 21 within reach of the fingers of a hand grasping the grip 15.

By means of the apparatus as will be obvious the hose or nozzle end of the hose may be carried from place to place on the lawn to direct the stream of water as may be desired with reference to the surface of the lawn or the shrubbery thereon or at the borders thereof, the nozzle being held close to the surface of the ground so as not to be exposed to the wind or gusts of air ordinarily affecting the same and under such conditions as not to involve the wetting the feet or the garments of the operator, and when it is desired to locate the hose nozzle in any particular position for continuous watering of a section of the lawn, the device may be placed upon the surface of the ground and the stem forced thereinto to anchor the same. With the stem thus anchored the body portion of the device may be raised more or less to remove the nozzle from the surface of the ground so that its range of distribution of water may be increased to the desired extent, the frictional engagement of the guide with the stem being sufficient to hold the same in its adjusted position.

It will be noted that the device with the exception of the stem which is slidably mounted with reference to the body portion, is constructed of a single blank of wire suitably coiled and deflected to provide the several elements above noted.

In Fig. 3 of the drawing is shown a modified form of the device. The modification resides in substituting a cylindrical wooden grip 15ª for the coiled grip 15, in connecting the sides 14 of the head by a straight bar 14ª upon which the grip 15ª is loosely mounted, and in so forming the strands of wire constituting the shank, which in this figure is designated 10ª, as to provide closely related circular end coils 10ᵇ and 10ᶜ and intermediate elongated open coils 10ᵈ. This construction permits the device to be made at a comparatively small cost and reduces its weight to the minimum. Although the shank 10ª embodies less material than the shank 10 and is therefore lighter and more easily and cheaply made, it is as strong, durable and efficient as that shank.

While the preferred embodiments of the invention are shown and described it will be understood that minor changes in the details of construction and arrangement of parts may be resorted to within the scope of what is claimed without departing from the spirit of the invention.

Having thus described the invention, what I claim is:—

1. A hose nozzle carrying and supporting device having a tubular shank provided at its upper end with a handle and at its lower end with a foot having hose receiving seats, and an anchoring stem slidingly fitting said shank, operatively accessible at its upper end from the handle and adapted to be depressed to penetrate the ground at its lower end.

2. A hose nozzle carrying and supporting device having a tubular shank provided at its upper end with a handle and at its lower end with a foot having hose receiving seats, and an anchoring stem slidingly fitting said shank, operatively accessible at its upper end from the handle and adapted to be depressed to penetrate the ground at its lower end, the foot carrying portion of the device being slidable with relation to the stem to vary the elevation of the hose carrying seats with reference to the surface of the ground.

3. A hose nozzle carrying and supporting device having a tubular shank provided at its upper end with a handle and at its lower end with a foot having hose receiving seats, and an anchoring stem slidingly fitting said shank, operatively accessible at its upper end from the handle and adapted to be depressed to penetrate the ground at its lower end, the shank consisting of coiled wire strands separated at their upper and lower ends to provide said handle and foot.

4. A hose nozzle carrying and supporting device having a tubular shank provided at its upper end with a handle and at its lower end with a foot having hose receiving seats, and an anchoring stem slidingly fitting said shank, operatively accessible at its upper end from the handle and adapted to be depressed to penetrate the ground at its lower end, the shank consisting of coiled wire strands separated at their upper and lower ends to provide said handle and foot, and being looped at the angles of the foot to form the hose receiving seats.

5. A hose nozzle carrying and supporting device having a tubular shank provided at its upper end with a handle and at its lower end with a foot having hose receiving seats, and an anchoring stem slidingly fitting said shank, operatively accessible at its upper end from the handle and adapted to be depressed to penetrate the ground at its lower end, said shank consisting of coiled strands separated at their upper and lower ends to form the handle and foot and said handle portion having upwardly diverging arms terminally connected by a coil forming a transverse grip.

6. A hose nozzle carrying and supporting device having a tubular shank provided at its upper end with a handle and at its lower end with a foot having hose receiving seats, and an anchoring stem slidingly fitting said shank operatively accessible at its upper end from the handle and adapted to be depressed to penetrate the ground at its lower end, the foot having a transverse bar provided with an intermediate guide eye for the lower portion of said stem.

In testimony whereof I affix my signature in presence of two witnesses.

JOHN D. SULLIVAN.

Witnesses:
ROYAL J. DOUGLAS,
JOSEPH CHEZ.